United States Patent [19]

Bergmann et al.

[11] 4,046,264
[45] Sept. 6, 1977

[54] APPARATUS FOR STACKING ARTICLES IN SHEET FORM FOR ELECTRICAL MACHINES

[75] Inventors: Ewald Bergmann, Rechberghausen; Alfred Bareis, Uhingen; Karl Dangelmaier, Holzheim; Alfred Kottmann, Donzdorf, all of Germany

[73] Assignee: L. Schuler GmbH, Germany

[21] Appl. No.: 664,693

[22] Filed: Mar. 8, 1976

[30] Foreign Application Priority Data

Mar. 6, 1975 Germany .............................. 2509709

[51] Int. Cl.² ...................... B65G 57/16; B65H 31/32
[52] U.S. Cl. ......................................... 214/8; 29/241; 271/218
[58] Field of Search ................ 214/6 DK, 8; 271/218; 29/203 L, 211 L, 241, 433

[56] References Cited

U.S. PATENT DOCUMENTS

| 2,283,629 | 5/1942 | Heftler ................................. 29/433 |
| 3,014,601 | 12/1961 | Swanson ................................. 214/8 |
| 3,946,884 | 3/1976 | Kato et al. ............................. 214/8 X |

FOREIGN PATENT DOCUMENTS

| 2,019,661 | 11/1971 | Germany ................................. 214/8 |
| 347,408 | 8/1960 | Switzerland ............................ 214/8 |

OTHER PUBLICATIONS

IBM Disclosure Bulletin, Component Orienting Apparatus, Demchyshyn, vol. 15, No. 1 (June 1972) pp. 194, 195.

*Primary Examiner*—L. J. Paperner
*Attorney, Agent, or Firm*—Craig & Antonelli

[57] ABSTRACT

Apparatus for stacking and intermittently discharging stacks of sheet material for electrical machines and the like. A plurality of mandrels are provided which are successively movable into a position for forming stacks of sheets continually supplied by a horizontal conveyor. A turntable is provided for moving the mandrels into and out of respective sheet receiving positions. In order to accommodate intermediate stacking of the sheets while mandrels are being exchanged, a mandrel tip is provided which is positionable in alignment with the mandrels when in a sheet receiving position. During normal stacking operations, the mandrel tip is supported at the respective mandrel. During exchange of mandrels clamping jaws hold the mandrel tip in position and a slide member is moved into a position so as to hold an intermediate stack of sheets on the mandrel tip. Once a new empty mandrel has been placed in position under the mandrel tip, the holding jaws and the slide means are moved so as to permit the intermediate stack to fall onto the mandrel to start another stack of sheets.

13 Claims, 2 Drawing Figures

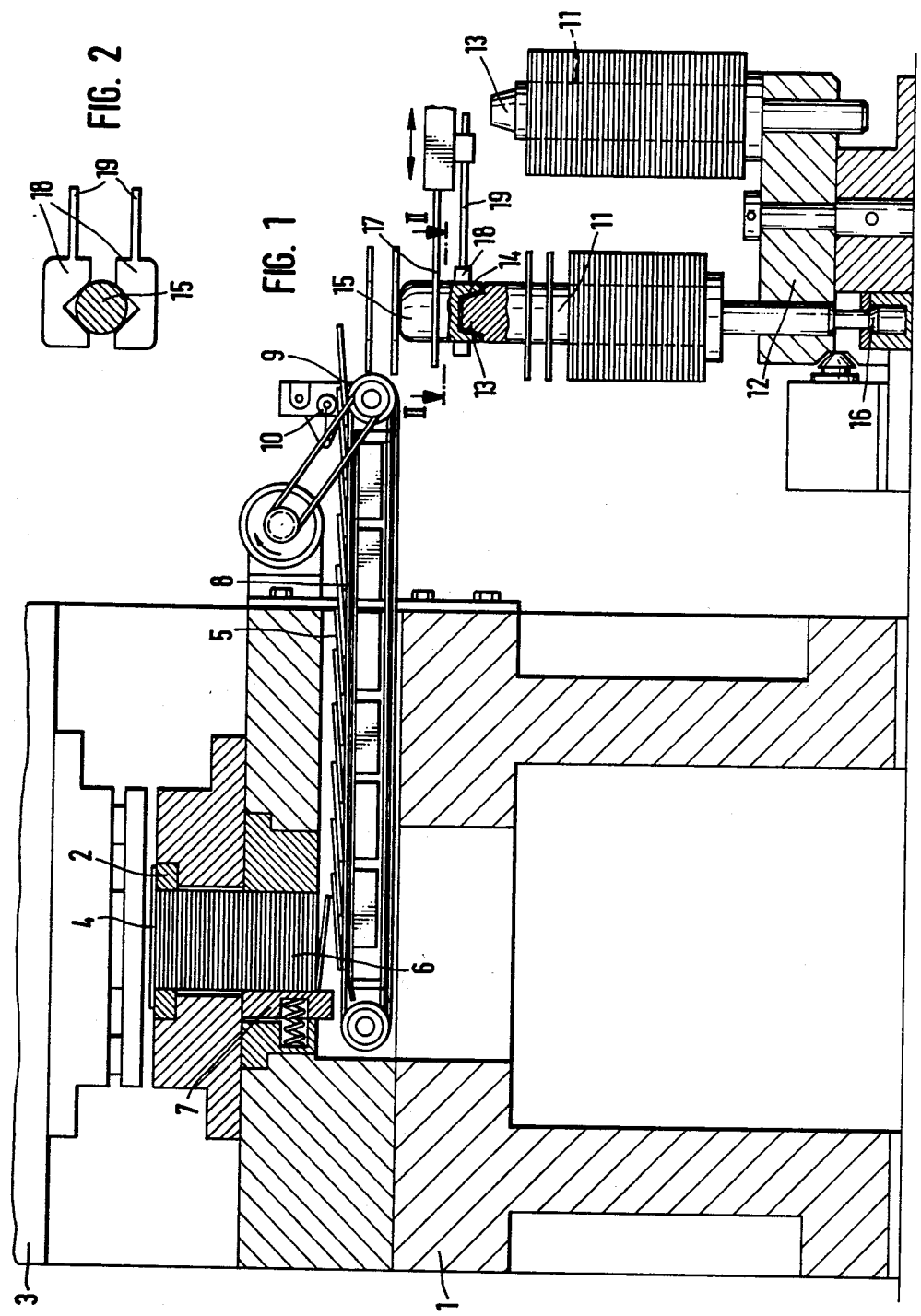

APPARATUS FOR STACKING ARTICLES IN SHEET FORM FOR ELECTRICAL MACHINES

BACKGROUND AND SUMMARY OF THE INVENTION

This invention relates to an apparatus for stacking and intermittently discharging the stacks of sheets for electrical machines and the like. More specifically, this invention relates to such apparatus of the type including a plurality of stacking mandrels and mandrel moving means for successively moving the mandrels into and out of sheet receiving positions at a delivery zone of a conveyor which continuously successively supplies the sheets. With this type of apparatus, in order to avoid interruption of the conveyor or the stacking process, some type of intermediate stacking means are needed to accommodate an exchange of mandrels.

Such an apparatus is shown, for example, in DAS (German Published Application) 2,019,661. In the process of using this apparatus, the sheets, worked on by a high-speed automatic punching machine, are transferred in a partially overlapping position to a magnetic conveyor belt. A roller is arranged at the delivery end of the magnetic conveyor belt. This roller holds the respectively subsequent sheet at its rearward end — as seen in the conveying direction — against the magnetic conveyor belt, even if the sheet has already left the belt for the largest part. This roller engages the sheet as the same is passing on to a mandrel constituting a main stacking device. Respectively one of several mandrels arranged on a stepwise-rotating turntable is located underneath the delivery end of the conveyor belt, so that the sheets, after being released by the roller, arrange themselves on a mandrel and form a main stack. As soon as the main stack is filled, an intermediate stacking device is suddenly moved under the delivery end of the magnetic belt conveyor, and the sheets which have been fed continuously are stored temporarily in the intermediate stacking device, fashioned as a collecting trough, while the mandrel, filled up by the main stack, is replaced by an empty mandrel by a further stepwise rotation of the turntable. Once this has been done, the sheets in intermediate storage are delivered to the empty mandrel and the intermediate stacking device is simultaneously swiveled out of the range of the delivery end of the magnetic conveyor belt. The formation of a new main stack on the basis of the intermediate pile can now proceed unhindered.

To obtain a secure reception and an improved alignment of the sheets during the short time interval of intermediate stacking, it has already been proposed in DOS (German Unexamined Laid-Open Application) 2,037,752 to provide the intermediate stacking device with stops and/or mountings, which align the sheets with respect to the mandrels of the main stacking device.

By means of these measures, an improvement of the intermediate stacking device has been made possible with regard to the reception and alignment of the sheets, but an optimum solution is only provided by the present invention, which relates, in an apparatus of the type described hereinabove, to attaining an intermediate stacking of the sheets with an exact centering and positioning with respect to a specific groove pattern.

According to preferred embodiments of the present invention, the intermediate stacking device is fashioned as a mandrel tip positionable at the delivery end of the conveyor in axial alignment with respective ones of the mandrels when the mandrels are in their respective sheet receiving positions. Holding means are provided for holding the mandrel tip in position to form an intermediate stack of sheets during exchange of mandrels. Once a new empty mandrel is disposed beneath the mandrel tip, the intermediate stack is released onto the mandrel and the stacking process continues with the sheets passing over the mandrel tip onto the mandrel being filled.

The advantages of the invention are to be seen, inter alia, in the fact that even during the exchange of a fully stacked mandrel against an empty mandrel the continuously delivered sheets are piled up in an exactly centered and positioned fashion, forming an intermediate stack, on a mandrel tip.

A simple, exact, and rapid coaxial operative connection can be produced during a mandrel change by fashioning the upper ends of the mandrels arranged on the stepwise-rotating turntable as an external cone and the lower end of the mandrel tip, which is only required in singular, as an internal cone.

A further advantage is attained according to preferred embodiments by connecting the holding means with a movable slide bounding the intermediate pile, this slide encompassing the mandrel tip in the manner of a fork. The holding means is arranged, as seen in the stacking direction, underneath the slide, whereby the opening and closing paths of the holding jaws of the holding means can be maintained to be very short.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 shows a cutting tool, a magnetic conveyor belt, a main stacking device, and an intermediate stacking device partially in a sectional view and partially in a lateral view, constructed in accordance with a preferred embodiment of the invention; and FIG. 2 shows a section along line II—II.

DETAILED DESCRIPTION OF THE DRAWINGS

Apertured sheets 5 for an electrical machine are cut out from a blank 4 which has the shape of a strip, for example, by means of a die 2 clamped onto a table 1 of a press, for example a high-speed automatic punching machine, and a punch attached to a reciprocating press ram 3. These sheets are then pushed downwardly under the pressure of the punch and form a stack 6. Under the counter effect of braking jaws 7, respectively only one sheet 5 of this stack falls onto a magnetic conveyor belt 8 driven at such a low speed that the sheets 5, for example 400 pieces per minute, are in partially overlapping position thereon. The sheet 5 are prevented from falling off the delivery end 9 of the magnetic conveyor belt 8 by a roller 10 which holds, by its inherent weight or by means of springs, the respectively subsequent sheet 5 passing on to a mandrel 11 constituting a main stacking device at its rear end — as seen in the conveying direction — against the magnetic conveyor belt 8 even if the sheet 5 has already left this conveyor belt for the largest part. That is, the sheets 5 are held so as to be stacked successively onto the mandrel 11.

Respectively one of several mandrels 11 disposed on an intermittently rotating turntable 12 is located underneath the delivery end 9 of the magnetic conveyor belt 8. The mandrels 11 are provided at their upper ends with an external cone 13. Cone 13 is insertable, by means of a reciprocating piston 16, in a self-centering manner coaxially in an internal cone 14 at the lower end of a mandrel tip 15 pertaining to an intermeidate stacking device. The mandrel tip 15 is, in principle, an extension of the mandrel 11 respectively located underneath the delivery end 9, so that an unimpeded stacking of the sheets 5 into a main stack takes place. If a mandrel 11 is filled, i.e. a main stack has been formed, then the holding means of the intermediate stacking device is activated. A slide 17 is suddenly introduced, by means of a drive mechanism not shown in detail, into the delivery zone underneath the delivery end 9 of the magnetic conveyor belt 8, thus encompassing the mandrel tip 15. At the same time, holding jaws 18 (FIG. 2) encompass the mandrel tip 15 underneath the slide 17 and fix the tip in the given position. The holding jaws 18 are operated by way of operating arms 19, preferably by means of a cylinder-piston unit, not shown in detail. Also, these holding jaws are connected to the holding means. Thereby, small opening and closing strokes of the holding jaws 18 can be obtained.

With the holding jaws 18 holding mandrel tip 15 in position, an intermediate stack of sheets 5 is formed on the mandrel tip 15 above slide 17, whereas the mandrel 11 with the main stack is lowered by means of the reciprocating piston 16. By another stepwise rotation of the turntable 12, an empty mandrel 11 is moved underneath the delivery end 9 and thus underneath the mandrel tip 15. The mandrel 11 is lifted by the reciprocating piston 16, so that the external cone 13 of the upper end of mandrel 11 is introduced, in a self-centering manner, into the internal cone 14 of the mandrel tip 15. The holding means is moved out of the delivery zone, the sheets 5 which have been stored intermediately are lowered onto the empty mandrel 11, and the formation of a new main stack on the basis of the intermediate stack can begin.

Due to the structure of the intermediate stacking device with the mandrel trip 15 which is held, secure against rotation, on the mandrel 11, it is possible to ensure during the formation of the intermediate stack an exact centering and positioning corresponding to the main stack, and it is readily possible to align the sheets 5 in accordance with a specific groove pattern. The mandrels 11 proper are likewise held securely against rotation in the turntable 12.

The holding means for the formation of the intermediate stack can also consist, according to other preferred embodiments of the invention, merely of the holding jaws 18 which in this case are preferably movable at right angles to the conveying direction of the sheets 5 into the delivery zone and again out of the delivery zone.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Apparatus for stacking and intermittently discharging stacks of sheet material for electrical machines and the like, said apparatus comprising:
   a plurality of mandrels configured for accepting a plurality of said sheets in stacked form thereon,
   mandrel-moving means for successively moving said mandrels into and out of a sheet receiving position at a delivery zone of conveyor means successively supplying said sheets, whereby a mandrel with a stack of sheets formed therein is movable away from the sheet receiving position and an empty mandrel is movable into said sheet receiving position to effect a mandrel exchange,
   a mandrel tip selectively positionable on respective ones of said mandrels at said delivery zone when said mandrels are in said sheet receiving position for accommodating stacking of said sheets on said mandrels over said mandrel tip,
   means for engaging and holding said mandrel tip in position at said delivery zone during a mandrel exchange such that an intermediate stack of sheets can be accommodated on said mandrel tip during said mandrel exchange,
   and transfer means for accommodating transfer of said intermediate stack to an empty mandrel after said mandrel exchange.

2. Apparatus according to claim 1, wherein a movable slide is provided for holding said intermediate stack on said mandrel tip.

3. Apparatus according to claim 2, wherein said transfer means includes means for moving said movable slide to a position permitting passage of said intermediate stack over said mandrel tip and onto an empty mandrel.

4. Apparatus for stacking and intermittently discharging stack of sheet material for electrical machines and the like, said apparatus comprising:
   a plurality of mandrels configured for accepting a plurality of said sheets in stacked form thereon,
   mandrel moving means for successively moving said mandrels into and out of a sheet receiving position at a delivery zone of conveyor means successively supplying said sheets, whereby a mandrel with a stack of sheets formed thereon is movable away from the sheet receiving position and an empty mandrel is movable into said sheet receiving position to effect a mandrel exchange.
   a mandrel tip selectively positionable at said delivery zone in alignment with respective ones of said mandrels when in said sheet receiving position for accommodating stacking of said sheets on said mandrels over said mandrel tip,
   mandrel tip holding means for holding the mandrel tip in position at said delivery zone during a mandrel exchange such that an intermediate stack of sheets can be accommodated on said mandrel tip during said mandrel exchange,
   said holding means including holding jaws for encompassing said mandrel tip, and
   transfer means for accommodating transfer of said intermediate stack to an empty mandrel after said mandrel exchange.

5. Apparatus according to claim 4, wherein said holding means includes position-cylinder means for actuating said holding jaws.

6. Apparatus for stacking and intermittently discharging stacks of sheet material for electrical machines and the like, said apparatus comprising:

a plurality of mandrels configured for accepting a plurality of sheets in stacked form thereon, mandrel moving means for successively moving said mandrels into and out of a sheet receiving position at a delivery zone of conveyor means successively supplying said sheets, whereby a mandrel with a stack of sheets formed thereon is movable away from the sheet receiving position and an empty of mandrel is movable into said sheet receiving position to effect a mandrel exchange, a mandrel tip positionable at said delivery zone in alignment with respective ones of said mandrels when in said sheet receiving position for accommodating stacking of said sheets on said mandrels over said mandrel tip, mandrel tip holding means for holding said mandrel tip in position at said delivery zone during a mandrel exchange such that an intermediate stack of sheets can be accommodated on said mandrel tip during said mandrel exchange, said holding means including holding jaws for encompasing said mandrel tip, a movable slide for holding said intermediate stack on said mandrel tip, and transfer means for accommodating transfer of said intermediate stack to an empty mandrel after said mandrel exchange, said transfer means including means for moving said movable slide to a position permitting passage of said intermediate stack over said mandrel tip and onto an empty mandrel.

7. Apparatus according to claim 6, wherein said movable slide encompasses the mandrel tip in the manner of a fork at a position along said mandrel tip spaced from said holding jaws.

8. Apparatus according to claim 6, wherein said mandrels extend vertically, and wherein said mandrel moving means includes means for lifting and lowering said mandrels in the direction of their longitudinal axes.

9. Apparatus for stacking and intermittently discharging stacks of sheet material for electrical machines and the like, said apparatus comprising:

a plurality of mandrels configured for accepting a plurality of sheets in stacked form thereon, each mandrel is provided at one end with an external cone, mandrel moving means for successively moving said mandrels into and out of a sheet receiving position at a delivery zone of conveyor means successively supplying said sheets, whereby a mandrel with a stack of sheets formed thereon is movable away from the sheet receiving position and an empty mandrel is movable into said sheet receiving position to effect a mandrel exchange, a mandrel tip positionable at said delivery zone in alignment with respective ones of said mandrels when in said sheet receiving position for accommodating stacking of said sheets on said mandrels over said mandrel tip, said mandrel tip is provided at one end with an internal cone matingly engageable with respective ones of said external cones, mandrel tip holding means for holding said mandrel tip in position at said delivery zone during a mandrel exchange such that an intermediate stack of sheets can be accommodated on said mandrel tip during said mandrel exchange, and transfer means for accommodating transfer of said intermediate stack to an empty mandrel after said mandrel exchange.

10. Apparatus for stacking and intermittently discharging stacks of sheet material for electrical machines and the like, said apparatus comprising:

a plurality of mandrels configured for accepting a plurality of said sheets in stacked form thereon, mandrel moving means for successively moving said mandrels into and out of a sheet receiving position at a delivery zone of conveyor means successively supplying said sheets, whereby a mandrel with a stack of sheets formed thereon is movable away from the sheet receiving position and an empty mandrel is movable into said sheet receiving position to effect a mandrel exchange, a mandrel tip positionable at said delivery zone in alignment with respective ones of said mandrels when in said sheet receiving position for accommodating stacking of said sheets on said mandrels over said mandrel tip, mandrel tip holding means for holding said mandrel tip in position at said delivery zone during a mandrel exchange such that an intermediate stack of sheets can be accommodated on said mandrel tip during said mandrel exchange, a movable slide for holding said intermediate stack on said mandrel tip, said holding means is connected with said movable slide, and transfer means for accommodating transfer of said intermediate stack to an empty mandrel after said mandrel exchange.

11. Apparatus for stacking and intermittently discharging stacks of sheet material for electrical machines and the like, said apparatus comprising:

a plurality of vertically extending mandrels configured for accepting a plurality of said sheets in stacked form thereon, mandrel moving means for successively moving said mandrels into and out of a sheet receiving position at a delivery zone of conveyor means successively supplying said sheets, whereby a mandrel with a stack of sheets formed thereon is movable away from the sheet receiving position and an empty mandrel is movable into said sheet receiving position to effect a mandrel exchange, said mandrel moving means including means for lifting and lowering said mandrels in the direction of their longitudinal axes, a mandrel tip positionable at said delivery zone in alignment with respective ones of said mandrels when in said sheet receiving position for accommodating stacking of said sheets on said mandrels over said mandrel tip, mandrel tip holding means for holding said mandrel tip in position at said delivery zone during a mandrel exchange such that an intermediate stack of sheets can be accommodated on said mandrel tip during said mandrel exchange, and transfer means for accommodating transfer of said intermediate stack to an empty mandrel after said mandrel exchange.

12. Apparatus according to claim 11, wherein said conveyor means is a horizontal conveyor means for conveying said sheets in a substantially horizontal position thereon.

13. Apparatus according to claim 12, wherein said conveyor means is disposed downstream of a press wherein said sheets are formed.

* * * * *